United States Patent
Tan et al.

(10) Patent No.: US 12,260,633 B2
(45) Date of Patent: Mar. 25, 2025

(54) METHOD FOR DETECTING DEFECTS AND ELECTRONIC DEVICE

(71) Applicant: Fulian Precision Electronics (Tianjin) Co., LTD., Tianjin (CN)

(72) Inventors: Fu-Yuan Tan, Taoyuan (TW); Ching-Han Cheng, Taoyuan (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 462 days.

(21) Appl. No.: 17/752,033

(22) Filed: May 24, 2022

(65) Prior Publication Data

US 2023/0196756 A1    Jun. 22, 2023

(30) Foreign Application Priority Data

Dec. 16, 2021   (CN) .......................... 202111545294.2

(51) Int. Cl.
*G06V 10/98*    (2022.01)
*G06N 3/045*    (2023.01)
(Continued)

(52) U.S. Cl.
CPC .......... *G06V 10/993* (2022.01); *G06N 3/045* (2023.01); *G06N 3/08* (2013.01); *G06V 10/82* (2022.01); *G06V 10/87* (2022.01)

(58) Field of Classification Search
CPC . G06T 2207/20081; G06T 2207/20084; G06T 7/11; G06T 2207/10004; G06T 2207/30168; G06T 2207/20021; G06T 2207/30164; G06T 7/73; G06T 7/0002; G06T 7/60; G06T 7/62; G06N 3/045;
(Continued)

(56) References Cited

U.S. PATENT DOCUMENTS

| | | | |
|---|---|---|---|
| 7,333,650 B2 * | 2/2008 | Yamamoto | G06T 7/0004 382/156 |
| 8,103,085 B1 * | 1/2012 | Zadeh | G06T 7/001 382/141 |
| 11,035,802 B2 * | 6/2021 | Chen | G06T 7/0004 |

FOREIGN PATENT DOCUMENTS

| | | | | |
|---|---|---|---|---|
| CN | 110726724 A | * | 1/2020 | ......... G01N 21/8851 |
| CN | 111199543 A | | 5/2020 | |

OTHER PUBLICATIONS

Machine translation of CN110726724A obtained from google patents (Year: 2020).*

(Continued)

*Primary Examiner* — Aaron W Carter
*Assistant Examiner* — Courtney Joan Nelson
(74) *Attorney, Agent, or Firm* — ScienBiziP, P.C.

(57) ABSTRACT

A defect detection method includes obtaining a first image corresponding to a first area on an object revealing an apparent defect, the first area bounding the area showing the apparent defect; selecting a detection model according to a size of the first image, the detection model selected being one of a group of three models based on dimensions of image, the image being in one of portrait, landscape, or regular square proportions; detecting and confirming or denying a defect on the first image according to the detection model and outputting a detection result, the use of only three possible AI models reduces the likelihood of mis-determinations. An electronic device and a non-volatile storage medium therein, for performing the above-described method, are also disclosed.

15 Claims, 5 Drawing Sheets

(51) Int. Cl.
*G06N 3/08* (2023.01)
*G06V 10/70* (2022.01)
*G06V 10/82* (2022.01)

(58) Field of Classification Search
CPC ........ G06N 3/08; G06N 3/0464; G06N 20/00;
G06F 18/253; G06F 18/214; G06F 18/24;
G06V 2201/07; G06V 10/25; G06V
10/82; G06V 2201/06; G06V 10/993;
G06V 10/87; G01N 21/896; G01N
2021/8854; G01N 2223/401
See application file for complete search history.

(56) References Cited

OTHER PUBLICATIONS

VCIP2020; "Fully Neural Network Mode Based Intra Prediction of Variable Block Size"; Jul. 9, 2021.

\* cited by examiner

METHOD FOR DETECTING DEFECTS AND ELECTRONIC DEVICE

FIELD

The subject matter herein generally relates to quality control, more specifically to a defect detection method and an electronic device.

BACKGROUND

In the manufacturing process, a circuit board undergoes an optical inspection stage and a re-inspection stage. The optical detection stage is used to obtain the image of the object to be tested and determine whether there are defects in the image of the object being tested. The re inspection stage is to further detect and manually mark the defects determined in the optical inspection stage. In the optical detection stage, the probability of error is usually high, which may cause additional burden in manual re-inspection. Excessive manpower devoted in the manufacturing process may be reduced.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
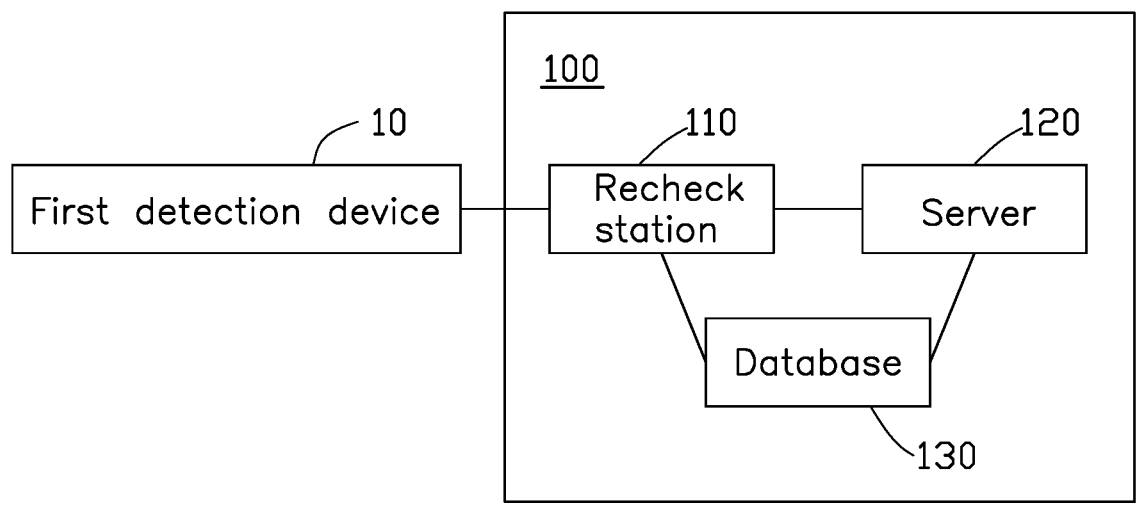
FIG. 1 is a schematic diagram of an embodiment of a defect detection system according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a defect detection system 100 in accordance with an embodiment of the present disclosure.

The system structure and related components in the defect detection system 100 of the present disclosure will be described below through FIG. 1.

The defect detection system 100 is connected to a first detection device 10, The first detection device 10 has an optical element for photographing the object 20 and obtaining the image of the object. The first detection device 10 performs a preliminary defect detection of the object through the image of the object 20. If the first detection device 10 determines as a result that a certain area (i.e., the first area) on the object has a defect, the image of the area (i.e., the first image) is cut out and transmitted to the defect detection system 100.

In some embodiments, the first detection device 10 is, for example, an automatic optical inspection equipment (AOI) or an automatic visual inspection equipment (AVI). The objects 20 are, for example, various types of circuit boards. The common defects are, for example, inner and outer layer deviation, finger discoloration, foreign matter on fingers, finger copper exposure, unclear text, ink falling off, gold face discoloration, gold face foreign matter, gold face copper exposure, finger crush injury, anti-welding falling off, gold face crush injury, or soft board dirt. The first image is an image regarded as showing features of defects on the first area on the object and is determined to have defects. The present disclosure is not limited to the above-mentioned cases of automatic optical detection devices, objects, and defects.

In the embodiment, the defect detection system 100 includes a recheck station 110, a server 120, and a database 130.

The recheck station 110 is connected to the first detection device 10 and is used to receive the data of the first image and the first image output from the first detection device 10. The data of the first image can be the size of the first image (such as length, width) and production line data of the object 20 (such as station, material, time, batch, test result, packaging) in the production line.

In some embodiments, the recheck station 110 also stores the received first image in the recheck station 110.

In some embodiments, the recheck station 110 is interconnected with other equipment in the defect detection system 100 and acts as a relay station for integrating equipment and data transmission. For example, if the first image is stored in a specific directory in the hard disk of the recheck station 110, the specific directory is set as a shared folder, and the shared folder is mounted on the server 120, the server 120 can obtain the first image from the shared folder.

In some embodiments, the recheck station 110 is a verification repair server, which is not specifically limited in the present disclosure.

The server 120 is connected between the recheck station 110 and the database 130. The server 120 stores a detection model in AI. The server 120 is used to obtain the first image, select the corresponding detection model according to the size of the first image, detect the defect of the first image according to the detection model, and output the detection result to the recheck station 110. The recheck station 110 is also used to display the detection results output by the server 120.

In some embodiments, the server 120 is, for example, a server or a server cluster including multiple servers, which is not specifically limited in the present disclosure.

The database 130 is used to store the detection results output by the first detection device 10 and the detection results output by the server 120.

In some embodiments, the database 130 is used to store the data of the first image outputted by the recheck station 110.

In some embodiments, the database 130 may be a local database. The database 130 is, for example, MySQL or ES (elastic search), which is not specifically limited in the embodiment of the present disclosure.

In some embodiments, the defect detection system 100 also includes a first software (not shown), which can run in the recheck station 110. The first software is used to monitor the data of the first image, enter the recheck station 110, store the data of an image in the database 130, and store the data of the first image in a queue. The first software is also used to receive the detection result determined by the server 120 and display the detection result on the display screen of the recheck station 110.

In some embodiments, the defect detection system 100 also includes a second software (not shown), which can run on the server 120. The second software is used to take out the data of the first image from the queue and transmit the data of the first image to the server 120. The second software is also used to receive the detection results output by the server 120 and transmit the detection results output by the server 120 to the first software.

In the embodiment, when the recheck station 110 is connected to the server 120 and the database 130, data is exchanged through physical lines and various input ports, such as universal serial bus (USB), serial port, FireWire (IEEE 1394 standard), VME bus. Alternatively, the recheck station 110 can also be implemented through various communication chips, such as BLUETOOTH chip and WI-FI chip, so as to exchange data. The embodiment of the present disclosure is not specifically limited to this.

The following describes a process in which various elements interact in the defect detection system 100 to perform a defect detection method.

Figure 2:
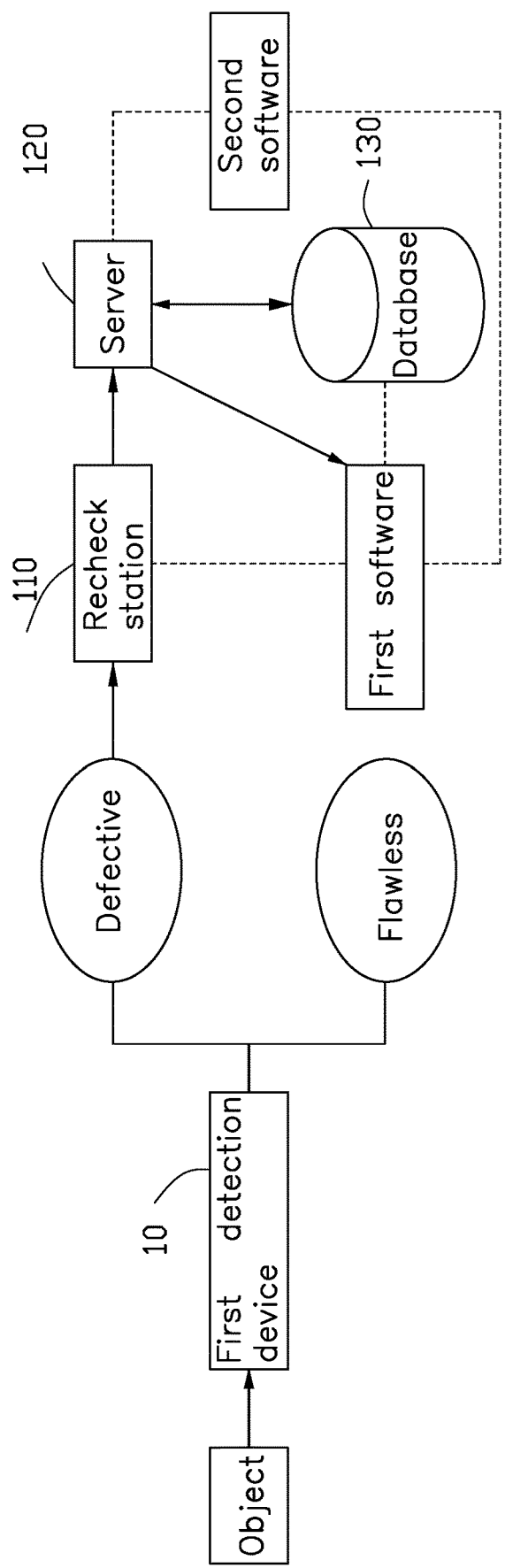
FIG. 2 is a schematic diagram of an embodiment of a process flow of the defect detection system according to the present disclosure.

FIG. 2 is a schematic diagram of the working process of the defect detection system according to the embodiment of the present disclosure.

The user puts the object 20 into the first detection device 10, and the first detection device 10 takes pictures of the object 20 and performs the first detection. If it is determined that the object is free of defects, there is no need to further examine the object 20. If it is determined that the object 20 is defective, the first detection device 10 will acquire the first image of the first area on the object 20 and transmit the first image to the recheck station 110. The recheck station 110 stores the detection result of the first detection of the object 20 by the first detection device 10 and the first image of the object 20 in a specific directory in the hard disk of the recheck station 110. The specific directory is set as a shared folder and mounted on the server 120. The first software loaded in the recheck station 110 monitors the entry of new data (such as the data of a new first image), stores the new data in the database 130, and waits in line for the automatic determination of the server 120. The second software extracts the data of the first image queued for processing from the database 130 and transmits the data of the first image to the server 120. The server 120 also takes out the first image from the shared folder, and the server 120 performs defect detection based on the data of the first image and the first image. The server 120 transmits the detection result back to the second software, and the second software transmits the detection result of the server 120 to the first software. The first software transmits the detection result of the server 120 back to the display software in the recheck station 110 to display the detection result of the server 120 in the recheck station 110.

Figure 3:
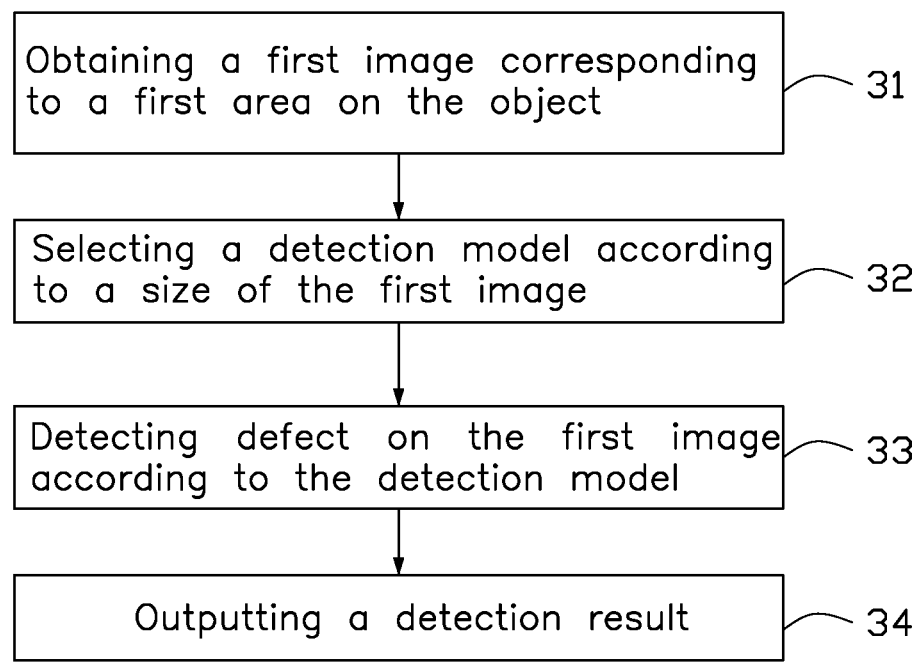
FIG. 3 is flowchart of an embodiment of a defect detection method according to the present disclosure.

FIG. 3 shows a flow chart of one embodiment of a defect detection method of the present disclosure.

In one embodiment, the defect detection method can be applied to the server 120.

As shown in FIG. 3, the defect detection method according to the embodiment of the present disclosure includes the following steps:

At block 31, obtaining a first image corresponding to a first area on the object, the first area is the area where the object is determined to be defective on the first detection.

The first detection device determines that the area of the defect is not unique, other defects may be apparent and thus the number of first areas may be multiple. Accordingly, there may be number of first images, which is not specifically described in the present disclosure.

At block 32, selecting a corresponding detection model according to a size of the first image.

In some embodiments, the selection of a corresponding detection model according to a size of the first image includes: selecting the corresponding detection model according to a proportion of size of the first image.

In some embodiments, the selection of the corresponding detection model according to the proportion of the size of the first image includes:

selecting a first detection model when the length of the first image is greater than the width of the first image;

selecting a second detection model when the length of the first image is less than the width of the first image in the manner of a landscape image; and selecting a third detection model when the length and width of the first image are equal.

The first detection model, the second detection model, and the third detection model are different.

In the embodiment, the products produced on the production line are diverse, the shapes and structures of objects 20 are diverse, and the sizes of the first image cut into the first area determined as a defect in the object 20 by the first detection device 10 is different. If multiple models are trained according to different products, their applicability is too low and too many models are difficult to manage. Therefore, only three detection models are trained according to the proportions of the size of the first image.

For different products, the size of the components on the product is generally different, and the locations of the components on the product are also different. The components set on the object can be determined, after the first detection device 10 produces the first image according to the size of each component on the object, the first detection device can distinguish by reference to length and width proportions of the size of the first image, and train three different detection models accordingly, so as to maximize the utility of the model.

In some embodiments, the angle and direction of the first detection device 10 photographing the object are the same, the length direction of the first image is parallel to the length direction of the image of the object, and the width direction of the object is parallel to the width direction of the image thereof.

Figure 4:
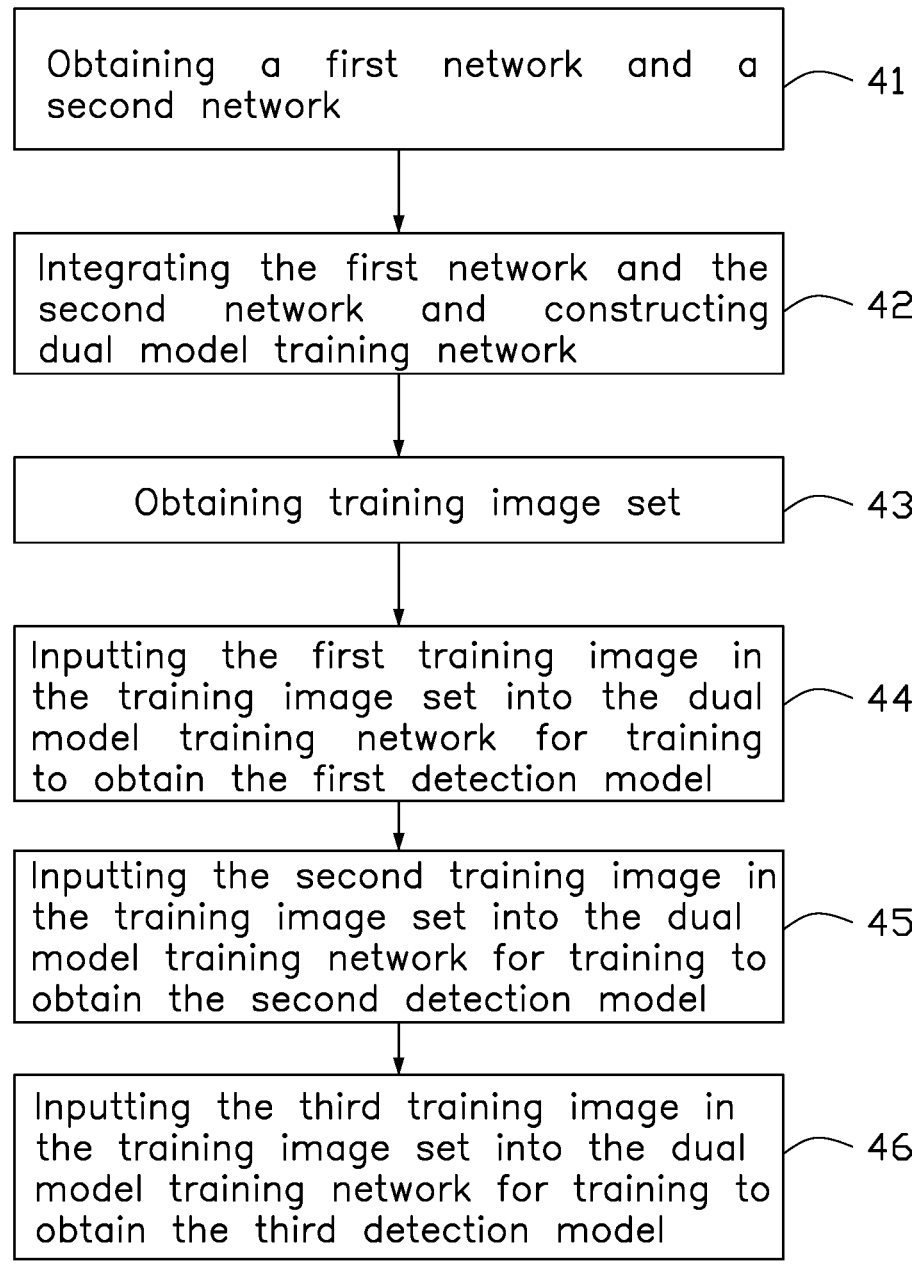
FIG. 4 is a schematic diagram of an embodiment of a method of training a model according to the present disclosure.

FIG. 4 shows a flow chart of one embodiment of a model training method of the present disclosure.

As shown in FIG. 4, the model training method according to the embodiment of the present disclosure includes the following steps:

At block 41, obtaining a first network and a second network.

The first network is variational automatic encoder (VAE) network, and the second network is depth residual network (RESNET).

In the embodiment, the VAE network includes an input layer, a coding network, an intermediate hidden variable layer, and a decoding network. The depth RESNET includes a convolution layer, a pooling layer, a hidden layer, and a full connection layer.

The RESNET is ResNet34 network.

At block 42, integrating the first network and the second network and constructing dual model training network.

In the embodiment, the hidden layer containing feature vectors of VAE network and the hidden layer containing feature vectors of RESNET are integrated in parallel, to obtain the dual model training network. A Softmax classifier can also be used as the output layer of the network.

In the embodiment, the Resnet34 network is used to reduce the gradient disappearance problem caused by too many layers in model training. With the new application of the VAE network, the mis-determinations causing a low detection rate can be improved. The dual model training network re-determines the features of a flawless image through reinforcement learning, and finally calculates the differences in features between the incoming image and the reconstructed image to more accurately classify the apparent defects in the image.

At block 43, obtaining a set of training images.

In the embodiment, the set of the training images include a plurality of labeled training images. The training images are manually labeled training sample images, which are used to train the detection model.

The server is mounted on the recheck station, so that the image captured by the first detection device and the data document about the captured image generated by the first detection device can be obtained, and the document content can be analyzed. Cutting the image according to the size of the first area and marking it as defective or flawless, and saving the marked image (training image) to the specified path are carried out. The cut images are divided into three groups according to the proportion of the size, the length of the training image is greater than the width, the length of the training image is less than the width, and the length of the training image is equal to the width, the three groups of training images are used to train three models respectively to maximize the utility of the model.

At block 44, inputting the first training image in the training image set into the dual model training network for training to obtain the first detection model.

The length of the first training image is greater than the width of the first training image.

At block 45, inputting the second training image in the training image set into the dual model training network for training to obtain the second detection model.

The length of the second training image is less than the width of the second training image.

At block 46, inputting the third training image in the training image set into the dual model training network for training to obtain the third detection model.

The length of the third training image is equal to the width of the third training image.

In the embodiment, the VAE network and RESNET are used for dual model training. The production line data is imported into the local database every day. The online detection model can calculate the accuracy of the model through the data in the database. The user or server can decide whether to update the detection model according to the accuracy of the model.

At block 33, detecting defect on the first image according to the detection model.

In the embodiment, the server detects the defect of the first image according to the detection model. If the first image is detected as a defect, the detection result that the object is defective is output. If the first image is detected to be flawless, the detection result that the object is flawless is output.

At block 34, outputting a detection result.

In the embodiment, the server outputs the detection result, and displays the detection result. If the detection result is a defect confirmed, the output object is defective. If the detection result is flawless, the output object is flawless.

Figure 5:
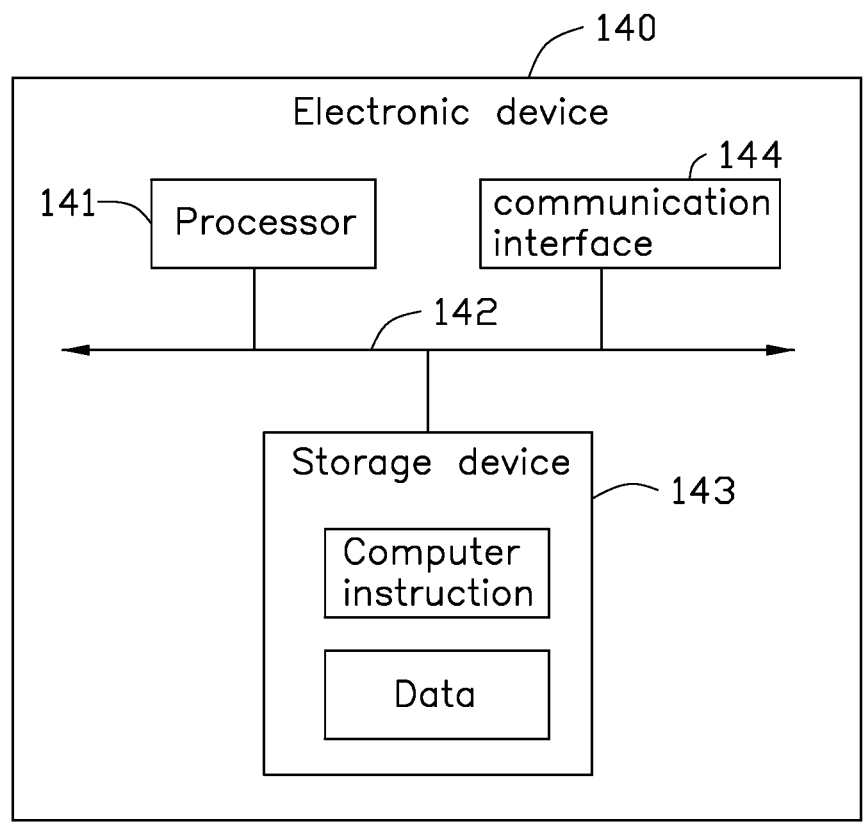
FIG. 5 is block diagram of an embodiment of an electronic device according to the present disclosure.

FIG. 5 illustrates an electronic device 140 in accordance with an embodiment of the present disclosure.

The electronic device 140 can further include, but is not limited to, at least one processor 141, a communication bus 142, a storage device 143, and at least one communication interface 60. The processor 141, the storage device 143 and the communication interface 142 can be connected and communicate with each other through the communication bus 142. The processor 141 may execute the program code of program segment stored in the storage device 143 to implement blocks 31-34 in method shown in FIG. 3 and blocks 41-46 in method shown in FIG. 4.

The block diagram merely shows an example of the electronic device 140 and does not constitute a limitation to the electronic device 140. In other examples, more or less components than those illustrated may be included, or some components may be combined, or different components used. For example, the electronic device 140 may also include input and output devices, a network access device, a bus, and the like.

The processor 141 may be a central processing unit (CPU), or may be other general-purpose processor, a digital signal processor (DSP), an application specific integrated circuit (ASIC), a Field-Programmable gate array (FPGA) or other programmable logic device, a transistor logic device, a discrete hardware component. The processor 141 may also be any conventional processor. The processor 141 is a control center of the electronic device 200. The processor 141 may include one or more chips, such as a Pentium chip, and the processor 141 may include an AI accelerator, such as a neural processing unit (NPU).

The communication bus 142 may include a path for transmitting information between various components of the electronic device 140 (such as the processor 141, the storage device 143, and the communication interface 144).

The storage device 143 can be used to store program segments. The processor 141 operates or executes the program segments stored in the storage device 143 and recalls data stored in the storage device 143 and implements various functions of the electronic device 140. The storage device 143 may mainly include a storage program area and a storage data area, the storage program area may store an operating system, an application (such as sound playback and image playback) required for at least one function. The storage data area may store data created.

The storage device 143 may include a RAM, the storage device 143 may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

The storage device 143 may exist independently and be connected to the processor 141 through the communication bus 142. The storage device 143 may also be integrated with the processor 141.

The communication interface 144 uses devices such as any transceiver to communicate with other devices or communication networks, such as Ethernet, wireless access network (RAN), wireless local area networks (WLAN).

In one embodiment, the processor 141 may include one or more CPUs.

In one embodiment, the electronic device may include a plurality of processors. Each of these processors can be a single core processor or a multi-core processor. The processor herein may refer to one or more devices, circuits, and/or processing cores for processing data, such as computer program instructions.

The embodiment of the present disclosure also provides a non-transitory storage medium. The computer instruction is stored in the non-transitory storage medium. When the instruction runs on the electronic device 140, the electronic device 140 can execute the defect detection method provided by the above embodiments. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random-access memory (RAM), electrical carrier signals, telecommunications signals, and software distribution media.

The embodiment of the present disclosure also discloses a computer program. When the computer program product runs on the computer, the computer is caused to perform the above related steps to realize the defect detection method in the above embodiments.

The embodiment of the present disclosure also provides a device, which can be a chip, component or module, and the device can include a connected processor and a storage device. The storage device is used to store the computer execution instructions. When the device is running, the processor can execute the computer execution instructions stored in the storage device to enable the chip to execute the defect detection method in the above embodiments.

The electronic device, the computer storage medium, the computer program of the method or the chip provided in this embodiment are used to execute the method provided above. Therefore, the beneficial effects it can achieve can refer to the beneficial effects in the method provided above and will not be repeated here.

For the convenience and simplicity of description, only the division of the above functional modules is illustrated. In practical application, the above functions can be allocated by different functional modules according to needs, that is, the internal structure of the device can be divided into different functional modules to complete all or part of the functions described above.

The device embodiments described above are only schematic. For example, the division of the module or unit is only a logical function division. In actual implementation, there can be another division mode. For example, multiple units or components can be combined or integrated into another device, or some features can be ignored or not executed. On the other hand, the mutual coupling or direct coupling or communication connection shown or discussed can be indirect coupling or communication connection through some interfaces, devices or units, and can be electrical, mechanical, or other forms.

The unit described as a separate part can be or may not be physically separated, and the part displayed as a unit can be one physical unit or multiple physical units, that is, it can be located in one place or distributed to multiple different places. Some or all of the units can be selected according to the actual needs to achieve the purpose of the embodiment.

Each functional unit in each embodiment of the present disclosure can be integrated into one processing unit, each unit can exist separately, or two or more units can be integrated into one unit. The above integrated units can be realized in the form of hardware or software functional units.

If the integrated unit is realized in the form of software functional unit and sold or used as an independent product, it can be stored in a readable storage medium. In essence, the technical solution of the embodiment of the present disclosure or the part that contributes to the prior art or all or part of the technical solution can be embodied in the form of a software product, which is stored in a storage medium and includes several instructions to enable a device (which can be a single chip microcomputer, chip) or processor to perform all or part of the steps of the method described in each embodiment of the present disclosure. The storage media includes USB flash disk, mobile hard disk, read only memory (ROM), random access memory (RAM), magnetic disc or optical disc and other media that can store program code.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A defect detection method comprising:
   obtaining a first image corresponding to a first area on an object; wherein the first area is where an area on the object determined to be defective after a first detection;
   selecting a detection model according to a size of the first image; and
   detecting defects on the first image according to the detection model and outputting a detection result;
   selecting the detection model according to a proportion of a length of the first image and a width of the first image;
   wherein the selecting the detection model according to a proportion of length and width of the first image, further comprises:
   selecting a first detection model if the length of the first image is greater than the width of the first image;
   selecting a second detection model if the length of the first image is less than the width of the first image.

2. The defect detection method according to claim 1, wherein the selecting the detection model according to a proportion of length and width of the first image, further comprises:

selecting a third detection model if the length of the first image is equal to the width of the first image.

3. The defect detection method according to claim 2, further comprising:
obtaining a first network and a second network; and
integrating the first network and the second network and constructing dual model training network.

4. The defect detection method according to claim 3, wherein the first network is a variational automatic encoder (VAE) network, and the second network is a depth residual network (RESNET).

5. The defect detection method according to claim 3, further comprising:
obtaining a set of training images;
inputting a first training image in the set into the dual model training network to train and to obtain the first detection model; wherein a length of the first training image is greater than a width of the first training image;
inputting a second training image in the set into the dual model training network to train and to obtain the second detection model; wherein a length of the second training image is less than a width of the second training image; and
inputting a third training image in the set into the dual model training network to train and to obtain the third detection model; wherein a length of the third training image is equal to a width of the third training image.

6. An electronic device comprising:
a storage device; and
at least one processor, wherein the storage device stores one or more programs, when executed by the at least one processor, the one or more programs cause the at least one processor to:
obtain a first image corresponding to a first area on an object; wherein the first area is where an area on the object determined to be defective after a first detection;
select a detection model according to a size of the first image; and
detect defects on the first image according to the detection model and output a detection result;
select the detection model according to a proportion of a length of the first image and a width of the first image;
select a first detection model if the length of the first image is greater than the width of the first image;
select a second detection model if the length of the first image is less than the width of the first image.

7. The electronic device according to claim 6, wherein the at least one processor is further caused to:
select a third detection model if the length of the first image is equal to the width of the first image.

8. The electronic device according to claim 7, wherein the at least one processor is further caused to:
obtain a first network and a second network; and
integrate the first network and the second network and constructing dual model training network.

9. The electronic device according to claim 8, wherein the first network is variational automatic encoder (VAE) network, and the second network is depth residual network (RESNET).

10. The electronic device according to claim 8, wherein the at least one processor is further caused to:
obtain a set of training images;
input a first training image in the set into the dual model training network to train and to obtain the first detection model; wherein the length of the first training image is greater than the width of the first training image;
input a second training image in the set into the dual model training network to train and to obtain the second detection model; wherein a length of the second training image is less than a width of the second training image; and
input a third training image in the set into the dual model training network to train and to obtain the third detection model; wherein a length of the third training image is equal to a width of the third training image.

11. A non-transitory storage medium having stored thereon instructions that, when executed by a processor of a computer device installed in an electronic device, causes the processor to perform a defect detection method, wherein the method comprises:
obtaining a first image corresponding to a first area on an object; wherein the first area is where an area on the object determined to be defective after a first detection;
selecting a detection model according to a size of the first image; and
detecting defects on the first image according to the detection model and outputting a detection result;
selecting the detection model according to a proportion of a length of the first image and a width of the first image;
wherein the selecting the detection model according to a proportion of a length of the first image and a width of the first image, comprises:
selecting a first detection model if the length of the first image is greater than the width of the first image;
selecting a second detection model if the length of the first image is less than the width of the first image.

12. The non-transitory storage medium according to claim 11, wherein the selecting the detection model according to a proportion of a length of the first image and a width of the first image, comprises:
selecting a third detection model if the length of the first image is equal to the width of the first image.

13. The non-transitory storage medium according to claim 12, further comprising:
obtaining a first network and a second network; and
integrating the first network and the second network and constructing dual model training network.

14. The non-transitory storage medium according to claim 13, wherein the first network is variational automatic encoder (VAE) network, and the second network is depth residual network (RESNET).

15. The non-transitory storage medium according to claim 13, further comprising:
obtaining a set of training images;
inputting a first training image in the set into the dual model training network to train and to obtain the first detection model; wherein the length of the first training image is greater than the width of the first training image;
inputting a second training image in the set into the dual model training network to and train to obtain the second detection model; wherein a length of the second training image is less than a width of the second training image; and
inputting a third training image in the set into the dual model training network to train and to obtain the third detection model; wherein a length of the third training image is equal to a width of the third training image.

* * * * *